United States Patent [19]

Wiltz, Jr. et al.

[11] Patent Number: 5,001,167

[45] Date of Patent: Mar. 19, 1991

[54] SOLVENT RESISTANT POLYETHERPOLYURETHANE PRODUCTS

[75] Inventors: Eugene P. Wiltz, Jr.; Jose V. Saavedra, both of Lake Jackson, Tex.; Gautam D. Rajangam, Guilford, Conn.

[73] Assignee: The Dow Chemical Company, Midland, Mich.

[21] Appl. No.: 326,694

[22] Filed: Mar. 21, 1989.

[51] Int. Cl.$^5$ .............................................. C08G 18/14
[52] U.S. Cl. ................................... 521/174; 521/175; 521/176; 528/76; 528/77; 428/423.1; 428/423.9; 428/425.8; 252/182.27
[58] Field of Search ............... 521/174, 176, 914, 175; 528/76, 77; 428/423.9, 425.8, 423.1; 252/182.27

[56] References Cited

U.S. PATENT DOCUMENTS 3,169,934  2/1965  Dennett et al. ..................... 521/914
4,400,498  8/1983  Konishi et al. ........................ 528/60

Primary Examiner—Maurice J. Welsh

[57] ABSTRACT

A polyurethane polymer is prepared from a reaction mixture comprising
(a) a polyisocyanate component; and
(b) an active hydrogen component containing
  (i) at least about 50 weight percent based on total active hydrogen component of at least one polyether polyol having an average nominal functionality of at least about 3 and containing at least about 50 weight percent oxyethylene units said polyether polyol not being ethylene oxide capped. The polyurethane polymer is a hydrocarbon resistant elastomer suitable for use in environments wherein it is exposed to hydrocarbons.

27 Claims, 6 Drawing Sheets

SOLVENT RESISTANT POLYETHERPOLYURETHANE PRODUCTS

This invention relates to polyurethanes having resistance to hydrocarbons and articles made therefrom.

Conventional polyurethanes generally have poor resistance to hydrocarbons. That is, most polyurethanes tend to degrade, swell or dissolve in the presence of hydrocarbons and, therefore, generally cannot be used satisfactorily where exposed to hydrocarbons. The problem is discussed, for instance, in U.S. Pat. No. 4,713,399 wherein the use of certain poly(alklene carbonate) polyols in the preparation of polyurethane foams is reported to improve the solvent stability of the foams In U.S. Pat. No. 4,728,711, however, use is made of the solvent swelling of polyurethanes; the swelling seals fuel tanks.

Some solvent resistant polyurethane compositions involve certain aliphatic or cycloaliphatic polyisocyanates in the preparation of the polyurethanes. For instance, in U.S. Pat. No. 4,668,535, certain aliphatic polyisocyanates are used to prepare polyurethanes to be dissolved in a solvent and used with certain "cement" components. Methylene bis(4-isocyanatocyclohexane) is used in the polyurethanes taught in U.S. Pat. Nos. 4,247,678 and 4,487,913 to achieve fuel resistance.

Certain polyester polyols have also been used to prepare hydrocarbon-resistant polyurethanes. For instance, polyester polyols are used in the polyurethanes disclosed in U.S. Pat. No. 4,247,678.

Hydrocarbon resistance has sometimes been achieved by using certain polyurethanes combined with certain other polymers. For instance, in U.S. Pat. No. 4,522,979, certain polyurethane prepolymers are advantageously used with polyesters and polycarbonate resins.

Various other means have been employed in attempts to achieve solvent resistance. U.S. Pat. No. 4,404,498 discloses use of specific long chain diols and short chain triols, used in specific ratios, in preparing polyurethanes said to have solvent resistance. U.S. Pat. No. 4,146,723 teaches the use of certain urea diisocyanates in preparing polyurethane polyureas having improved chemical resistance. Solvent resistance is also reported to be improved by incorporating certain unsaturation into certain polyurethanes, which may, then, be crosslinked through the unsaturation.

It would be desirable to prepare polyurethanes exhibiting hydrocarbon resistance from aromatic polyisocyanates and polyether polyols. Polyether polyols are advantageously more resistant to hydrolysis than are polyester polyols and are widely available. Advantageously, the polyether polyurethanes would be hydrocarbon resistant without use of other polymers.

SUMMARY OF THE INVENTION

In one aspect, this invention is a polyurethane polymer prepared from a reaction mixture comprising
(a) a polyisocyanate component; and
(b) an active hydrogen component containing
  (i) at least about 50 weight percent based on total active hydrogen component of at least one polyether polyol having an average nominal functionality of at least about 3 and containing at least about 50 weight percent oxyethylene units said polyether polyol not being ethylene oxide capped and containing secondary hydroxyl groups; said polyurethane polymer being a hydrocarbon resistant elastomer.

In other aspects, the invention includes hydrocarbon resistant seals, conduits, containers linings, rollers, machine parts and mechanical belts formed from a polyurethane polymer prepared from a reaction mixture comprising (a) a polyisocyanate component; and (b) an active hydrogen component containing (i) at least 50 weight percent based on total active hydrogen component of at least one polyether polyol containing at least about 50 weight percent oxyethylene units.

In yet another aspect the invention is an active hydrogen containing composition comprising the following components:
(i) at least about 50 weight percent based on total active hydrogen component of at least one polyether polyol having an average nominal functionality of at least about 3 and containing at least about 50 weight percent oxyethylene units said polyether polyol not being ethylene oxide capped;
(ii) from about 0 to about 45 weight percent based on total active hydrogen component of at least one polyether polyol having an average nominal functionality of 2 and a molecular weight of from about 1000 to about 5000;
(iii) from about 5 to about 30 weight percent based on total active hydrogen component of at least one diol having a molecular weight less than or equal to about 400.

Polyurethane polymers of the invention are suitable for use in environments wherein the polymer is exposed to hydrocarbons because the polymers exhibit very little swelling therein.

DETAILED DESCRIPTION OF THE INVENTION

Figure 1:
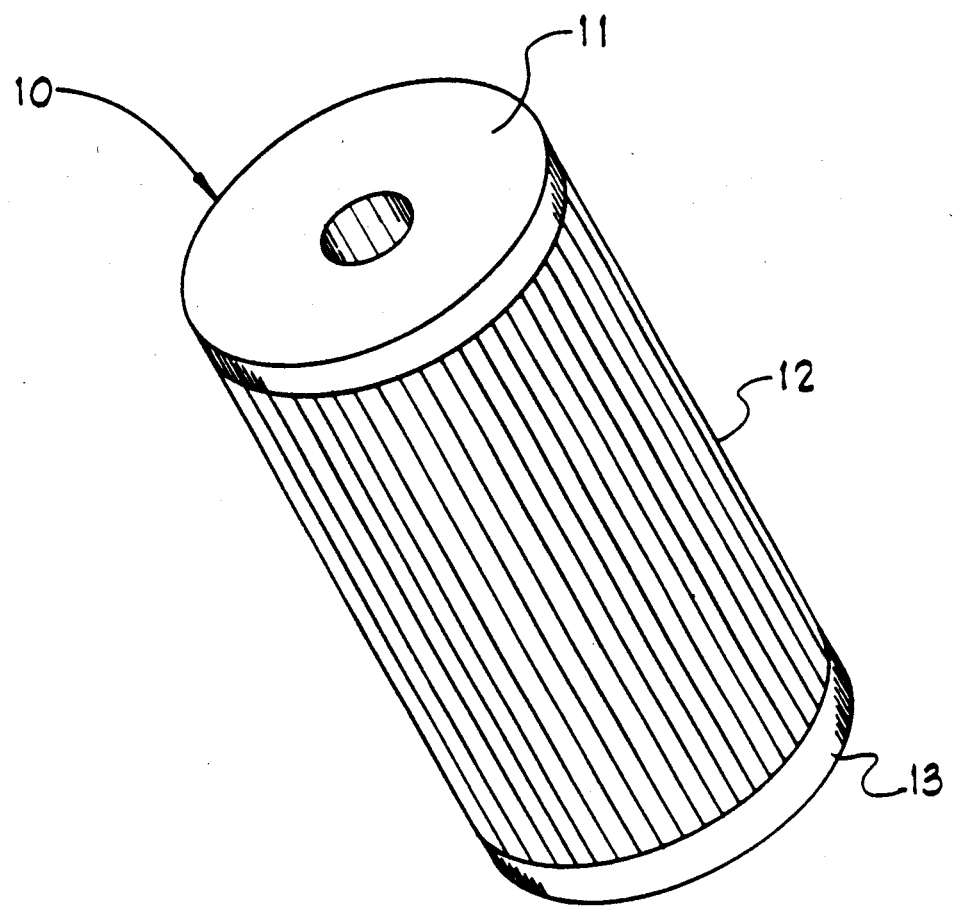
FIG. 1 represents a perspective view of a filter.

The polyurethane polymers of the invention are formed from the reaction of a polyisocyanate component and an active hydrogen component. The active hydrogen component is one or more compounds which are active in reacting with isocyanate groups as indicated by the Zerewitinoff test described by Kohler in the *Journal of the American Chemical Society*, Vol. 49, page 3181 (1927) which predicts the tendency of a hydrogencontaining group to react with isocyanates.

In the practice of the invention the active hydrogen composition comprises at least about 50 weight percent based on total active hydrogen component of at least one relatively high equivalent weight polyether polyol containing at least about 50 weight percent oxyethylene units. A polyether polyol is a relatively high equivalent weight active hydrogen component having at least two hydroxyl groups. Oxyethylene groups are divalent —O—CH$_2$—CH$_2$— groups. The term "relatively high equivalent weight" is used to indicate an equivalent weight of at least about 400. Relatively high equivalent weight polyether polyols for use in the practice of the invention advantageously have average equivalent weights of from about 500 to about 2500, preferably from about 800 to about 2300, and more preferably from about 1000 to about 2000.

Oxyethylene group containing polyether polyols can be prepared by polymerizing or copolymerizing ethylene oxide in the presence of at least one initiator compound. Catalysts such as boron trifluoride potassium hydroxide, triethylamine, tributyl amine and the like are generally advantageous. Initiator components include water, polyhydric alcohols having from about two to about eight hydroxyl groups, amines and the like. The ethylene oxide is preferably used in combination with at least one other alkylene oxide in preparing the polyether polyol. The other alkylene oxide is preferably propylene oxide or butylene oxide or mixtures thereof, and more preferably propylene oxide.

The ethylene and other alkylene oxides are suitably reacted in sequence or simultaneously (heterofeed), the latter being preferred. When the alkylene oxides are reacted simultaneously, random copolyethers are formed. When the oxides are reacted sequentially, block copolyethers are formed. Block copolyethers prepared using ethylene oxide as the final alkylene ether in a sequence have oxyethylene units on ends of the polyether chains and are referred to as ethylene oxide capped polyether polyols. Ethylene oxide capping produces polyether polyols having a very high percentage of primary hydroxyl groups, which, therefore, react very rapidly in forming polyurethane. Random copolyethers and block copolyethers having blocks of oxyethylene units internal in a polyether chain rather than on the ends thereof are referred to herein as Non-Capped polyols. These Non-Capped polyols have a greater proportion of internal oxyethylene units and lower proportion of terminal oxyethylene units than have ethylene oxide capped polyethers, and, therefore, have more secondary rather than primary hydroxyl groups which react less rapidly than the (primary hydroxyl) ethylene oxide capped polyols. Because of their lower reactivity and availability, the Non-Capped polyols are more preferred in the practice of the invention. Most preferably the polyols have at least about 25 percent secondary hydroxyl groups. Slower reaction times allow time to prepare and shape (e.g. by molding) elastomers having physical properties desirable in the hydrocarbon resistant articles of the invention.

For use in the practice of the invention, a polyether polyol advantageously contains at least about 50 weight percent oxyethylene units, preferably from about 50 to about 90, more preferably from about 60 to about 85, most preferably from about 65 to about weight percent oxyethylene units. Achieving a given weight percent of oxyethylene units frequently requires that the weight percentage of ethylene oxide in total alkylene oxide used in a polymerization be somewhat greater than the weight percentage of oxyethylene units desired. For instance, about 80 weight percent ethylene oxide and 20 weight percent propylene oxide may be used together to produce a polyol having about 75 weight percent oxyethylene units.

The nominal functionality of a polyether polyol is determined by the initiating compound. Nominally, the polyether has the same number of hydroxyl groups as the initiating compound had active hydrogen groups. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, as well as pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for forming polyether polyols useful in the practice of the invention.

The polyether polyols containing at least about 50 weight percent oxyethylene units used in the practice of the invention advantageously have nominal functionalities of at least about 3, preferably from about 3 to about 8, more preferably from about 3 to about 4. The polyol advantageously has a molecular weight of from about 2000 to about 7500, preferably from about 2500 to about 7000, more preferably from about 3000 to about 6500, most preferably from about 4000 to about 6000.

The polyether polyols containing at least about 50 weight percent oxyethylene units are advantageously used in the practice of the invention with other organic compounds containing at least two active hydrogen containing groups as determined by the Zerewitinoff method. Suitable active hydrogen compounds are those conventionally employed in the preparation of polyurethanes such as the compounds described in U.S. Pat. No. 4,394,491, particularly in columns 3 through 5 thereof, wherein the compounds are called polyahls, which patent is incorporated herein by reference in its entirety.

These active hydrogen compounds preferably include relatively high equivalent weight polyols. Representatives of the suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II pp 5–6, 198–199 (1964); Kunststoff-Handbuch, Vol. VII, Vieweg-Hochtlen, Carl-Hanser-Verlag, Munich, pp. 45–71 (1966); and Organic Polymer Chemistry by K. J. Saunders, Chapman and Hall, London, pp. 323–325 (1973); and Developments in Polyurethanes, Vol 1, J. M. Burst, ed., Applied Science Publishers (1978) pp. 1–76.

In addition to polyether polyols as described previously, but having less than about 50 weight percent oxyethylene groups, polyesters having hydroxyl terminated chains are preferred for use as active hydrogen containing compounds. Examples of polyols also include hydroxy functional acrylic polymers, hydroxyl-containing epoxy resins, polyhydroxy terminated polyurethane polymers, polyhydroxylcontaining phosphorus compounds and alkylene oxide adducts of polyhydric thioethers, including polythioethers, acetals, including polyacetals. These polyols preferably have a nominal functionality less than that of the polyether polyol having at least about 50 weight percent oxyethylene groups, more preferably they have a nominal functionality of less than about 3, most preferably a nominal functionality of about 2.

It is preferred that polymer polyols be avoided in the practice of the invention, because polymer polyols introduce hardness not generally desirable in the elastomers of the invention. If polymer polyols are present, they should be insufficient amounts to undesirably affect the hardness of a polyurethane. More specifically, the active hydrogen components more preferably include insufficient polymer polyols to raise the Shore Hardness of a polyurethane elastomer prepared therefrom more than about 5 Shore A units above the hardness of a similar polyurethane prepared from the same formulations in the absence of polymer polyols.

Preferably, the active hydrogen component contains at least one chain extender as well as one or more relatively high equivalent weight active hydrogen compounds. The term "chain extender" is used herein to refer to an active hydrogen compound having at least two functional groups having active hydrogen atoms suitable for reaction with available isocyanate groups and having an equivalent weight advantageously less than or equal to about 400, preferably less than about 200, more preferably less than about 100. Chain extenders are preferably difunctional, that is, they have exactly two functional groups containing active hydrogen atoms per molecule. Mixtures of difunctional and trifunctional compounds are also useful. Suitable chain extenders include primary and secondary diamines, amino alcohols, amino acids, hydroxy acids, diols, glycols or mixtures thereof. Exemplary compounds include ethylene diamine, hydroxy amines such as ethanolamine, propanol amine, diethanol amine and the like. A chain extender is generally chosen to achieve preselected physical properties such as hardness, toughness, and the like, in the molded object.

Advantageous chain extenders include primary and secondary diamines which react readily with isocyanates. Such chain extenders include phenylene diamine, bis(3-chloro-4-aminophenyl)methane, 2,4-diamino-3,5-diethyl toluene, 2,6-diamine-3,5-diethyl toluene, trisecondary butanolamine, isopropanolamine, diisopropanolamine, N-(2-hydroxypropyl)ethylenediamine, N,N'-di(2-hydroxypropyl)ethylenediamine, dialkyl diaminobenzenes such as those disclosed in U.S. Pat. No. 4,526,905 and the like. Liquid mixtures of polyphenyl polymethylene-polyamines of the type obtained by condensing aniline with formaldehyde are also suitable, as are polyoxyalkylene polyamines such as those formed by aminating glycol initiated polyalkylene ethers, polyoxypropylene and the like. Amine chain extenders are generally sufficiently sterically hindered or chemically retarded to provide sufficient processing time in a RIM apparatus. Among diamine chain extenders, aromatic diamines having linear alkyl substituents of one to three carbon atoms in positions ortho to each amino group are generally advantageous.

Chain extenders having hydroxyl groups are preferred and include low molecular weight aliphatic alcohols such as 1,4-butane diol, ethylene glycol, trimethylolpropane, diethylene glycol, 1,4-cyclohexanedimethanol, and the like; aromatic ringcontaining diols such as bis-hydroxyethylhydroquinone, bisphenols, catechol, resorcinol and the like; amide or ester containing diols, amino alcohols and the like. Aliphatic diol chain extenders are more preferred and generally have a backbone of from 2 to 6 carbon atoms; 1,4 butane diol is most preferred.

Aminated polyalkylene polyethers such as aminated polyoxypropylene glycols and the like are also useful as chain extenders. Such polyalkylene polyethers benefi-
cially have average amino hydrogen equivalent weights of from about 60 to about 110.

Chain extenders of different types are optionally used in combination. For instance, mixtures of 2-cyano-p-phenylene diamine and an aliphatic mono or dicarboxylic acid are used together in a process disclosed in U.S. Pat. No. 3,839,292. Enamines and aromatic diamines, optionally with a diol, are used in the process disclosed in U.S. Pat. No. 4,552,945. Preferable mixtures of chain extenders include mixtures of glycols and aromatic diamines; mixtures of aminated polyalkylene polyethers and aromatic diamines; mixtures of glycols and aminated polyalkylene polyethers; and the like which are disclosed in U.S. Pat. No. 4,269,945 which is incorporated herein by reference.

Chain extenders are advantageously used in quantities of about 2.5 to about 100 percent by weight, preferably from about 5 to about 50 percent by weight and more preferably from about 12 to about 50 percent by weight based on total weight of relatively high equivalent weight active hydrogen containing compounds. Those skilled in the art are familiar with adjusting the amount of chain extender to achieve preselected physical properties such as stiffness, flexibility and the like.

Active hydrogen components useful in the practice of the invention preferably contain
  (i) at least about 50 weight percent based on total active hydrogen component of at least one polyether polyol containing at least about 50 weight percent oxyethylene units, said polyether polyol having a nominal functionality of at least about 3, said polyether polyol not being ethylene oxide capped;
  (ii) from about 0 to about 45 weight percent based on total active hydrogen component of at least one polyether polyol having an average nominal functionality of about 2, containing less than about 50 weight percent oxyethylene units, and having a molecular weight of from about 1000 to about 5000;
  (iii) from about 5 to about 30 weight percent based on total active hydrogen component of at least one diol having a molecular weight less than or equal to about 400.

Component (ii) is more preferably present in an amount of from about 20 to about 45 weight percent.

The isocyanate index is the ratio of isocyanate groups in the total isocyanate component to number of active hydrogen groups in the active hydrogen component times 100. Thus, a 100 index reflects stoichiometric amounts of isocyanate and active hydrogen compounds (including chain extenders and water, when present). An isocyanate index of from about 85 to about 125 is preferred for use in the practice of the invention. Increasing the index generally increases the hardness of a reactive polyurethane elastomer.

Molecular weight per crosslink is calculated by dividing the total weight of material used by the equivalents of active hydrogen compounds theoretically available for crosslinking. The equivalents of active hydrogen compounds theoretically available for crosslinking is taken to be the sum of the number of all the equivalents of active hydrogen compound in excess of that needed for stoichiometric reaction with isocyanate compounds. Excess over stoichiometric is the excess reflected in the index (e.g. an index of 95 reflects a 5% excess of active hydrogen groups) as well as that proportion of nominal reactive active hydrogen groups in excess of two per molecule (e.g. a triol has a nominal functionality of 3, which is ⅓ excess) 300 equivalents of a triol are used at 100 index, there are 100 equivalents excess. The sum of these two components of excess over stiochiometric are then divided into total weight of isocyanate components plus active hydrogen components used. A sample calculation for a mixture of polyisocyanates, reacted with a polyol and 1,4-butane diol is given in the Example 12 of the invention.

Generally speaking, when incorporated into polyurethanes, relatively high equivalent weight active hydrogen compounds produce segments of polymer called soft segments, which segments have relatively low glass transition temperatures. Relatively low glass transition temperatures are those generally below the temperatures of intended use of the polyurethane. Chain extenders in polyurethanes generally produce segments called hard segments, which are believed to align within the polymer to increase hardness over that of a polymer not having the hard segments. The amount and type of chain extender is generally chosen to achieve a preselected hardness and other preselected physical properties in a final polyurethane. Use of an isocyanate index above about 100 also increases the hard segment content, and, thus, the hardness. The percentage of hard segments is calculated by dividing the sum of the weights of chain extender, weight of isocyanate used to react with the chain extender and the weight of hard segment in any prepolymer used (as determined by dibutylamine back titration procedure of ASTM 1638-74) by the total weight of active hydrogen and polyisocyanate components used.

In the practice of the invention, polyurethanes preferably have a combination of hard segment content and molecular weight per crosslink that yields good hydrocarbon resistance as well as elastomeric properties. The molecular weight per crosslink is preferably at least about 2700 to maintain elastomeric properties. Preferred maximum of molecular weight per crosslink generally increases in proportion to the amount of hard segment in a polymer. For instance, when the hard segment content is on the order of about 35 weight percent, the molecular weight per cross segment is preferably less than about 7000, more preferably from about 2700 to about 7000. When the hard segment content is about 70 weight percent, however, the molecular weight per crosslink is preferably less than about 12000, more preferably from about 2700 to about 12000.

A 3 inch diameter disk of the polyurethane polymer of the invention having a thickness of 0.2 inches preferably withstands at least about 10 hours of a 100 psig (pounds per square inch gauge) pulse at 100 cycles per second at 250° F.

Polyisocyanate components suitable for use in the practice of the invention are organic compounds that contain at least two isocyanate groups. Such compounds are well known and readily available commercially. Polyisocyanate starting components include aromatic, aliphatic and cycloaliphatic polyisocyanates and combinations thereof. Representative polyisocyanates include diisocyanates such as m-phenylene diisocyanate, toluene-2,4-diisocyanate, toluene-2,6-diisocyanate, hexamethylene-diisocyanate, tetramethylene-diisocyanate, cyclohexane-1,4-diisocyanate, hexahydrotoluene diisocyanate (and isomers thereof), naphthylene-1,5-diisocyanate, 1-methoxyphenyl-2,4-diisocyanate, diphenylmethane-4,4'-diisocyanate, diphenylmethane2,4'-diisocyanate, 4,4'-biphenylene diisocyanate, 3,3'-dimethoxy-4,4'-biphenyl diisocyanate, 3,3'-dimethyl 4,4'-dimethyldiphenylmethane-4,4'-diisocyanate and the like; triisocyanates such as 4,4',4''-triphenylmethane triisocyanate, toluene-2,4,6-triisocyanate, and the like; tetraisocyanates such as 4,4'-dimethyldiphenylmethane2,2',5,5'-tetraisocyanate, 4,4'-dieyclohexanediisocyanate, isophorone diisocyanate, isomers of each and the like; as well as other polyisocyanates such as polyphenylisocyanate and the like and mixtures thereof.

Aromatic polyisocyanates are preferably used in the practice of the invention because polymers produced therefrom according to the practice of the invention demonstrate little swelling on exposure to hydrocarbons. Toluene diisocyanate, diphenylmethane-4,4'-diisocyanate, diphenylmethane-2,4'-diisocyanate and polymethylene polyphenylisocyanate and mixtures thereof are more preferred; and mixtures of diphenylmethane-2,4'-diisocyanate and/or diphenylmethane-4,4'-diisocyanate with polymethylene polyphenylisocyanate are most preferred because of their availability and the properties imparted to an elastomer prepared therefrom. The mixtures preferably contain at least about 25 weight percent polymethylene polyphenyisocyanate.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisocyanates obtained by phosgenation of a mixture of toluene diamines or crude diphenylmethylene diisocyanate obtained by phosgenation of crude diphenylmethylenediamine. Crude isocyanates are disclosed in U.S. Pat. No. 3,215,652.

Polyisocyanates useful in the practice of the invention are, optionally, derivatized to form prepolymers or quasi prepolymers. In general, a modified polyisocyanate useful in the practice of the invention has a free isocyanate content of from about 1 to about 40 percent by weight. To form prepolymers, diisocyanate starting components are reacted with less than a stoichiometric amount of active hydrogen-containing component. Suitable active hydrogen-containing components include such as dipropylene glycol, propylene glycol, hydroxy esters, amines, amino alcohols, thiols, thioesters, polypropylene glycols and the like.

In the practice of the invention, formation of a prepolymer is preferable when an ordered, structured polymerization reaction is desired. A prepolymer process is used to achieve more uniform chain extension of the polymer in processes where the regulation of competing reactions, such as between the isocyanate and water and the hydroxyl group of the polyol, is difficult to achieve. In these situations a prepolymer or quasi prepolymer is generally formed by reacting an excess of polyisocyanate with a polyol. The prepolymer is then reacted with a chain-extender, preferably in the presence of a catalyst. When a step of forming a prepolymer is undesirable or equipment favoring use of similar quantities of polyisocyanate and active hydrogen component is used, the components are reacted directly in what is referred to as a one shot process.

One or more catalysts are beneficially used in making polyurethanes. Suitable catalysts include tertiary amines, such as, triethylenediamine, N-methyl morpholine, N-ethyl morpholine, diethyl ethanolamine, N-coco morpholine, 1-methyl-4-dimethylaminoethyl piperazine, 3-ethoxy-N-dimethylpropylamine, N,N-dimethyl-N',N'-methyl isopropyl propylene diamine, N,N-diethyl-3-diethylaminopropylamine, dimethyl benzylamine, triethylamine, tributylamine, bis(N,N-diethylaminoethyl)adipate, 2-methylimidazole, 1,4-diaza-bicyclo-(2,2,2)-octane and the like. Other suitable catalysts include tin compounds such as stannous chloride, tin salts of carboxylic acids such as dibutyltin di-2-ethyl hexoate, dibutyl tin dilaurate, dibutyltin diacetate, di-2-ethylhexyltin oxide, and the like, as well as other organometallic compounds such as compounds of lead, arsenic, antimony, mercury and bismuth and compounds disclosed in U.S. Pat. No. 2,846,408 and the like. Silamines having carbon-silicon bonds such as those described in German Patent 1,229,290 including 2,2,4-trimethyl-2-silamorpholine and the like as well as basic nitrogen compounds such as tetraalkylammonium hydroxides, alkali metal hydroxides such as sodium hydroxide, alkali metal phenolates such as sodium phenolate, and alkali metal alcoholates, such as sodium methylate, hexahydrotriazines and the like are also useful catalysts. Mixtures of catalysts are also suitable.

Metal atom-containing catalysts are generally used in a quantity of from about 0.0025 to 0.5 percent by weight based on active hydrogen containing starting components. Amine catalysts are generally used in a quantity of from about 0.001 to 5 percent by weight based on active hydrogen containing starting components. Those skilled in the art are able to select a catalyst composition and quantity suitable to accelerate the reaction between starting components. Representative catalysts and details regarding their use are found in *Kunstoff-Handbuch,* Vol. VII, published by Vieweg and Hochtlen, Carl-Hanser-Verlag, Munich 1966, pp. 96–102.

Additives such as surface active agents, antistatic agents, plasticizers, fillers, flame retardants, pigments, stabilizers such as antioxidants, fungistatic and bacteriostatic substances and the like are optionally used in polyurethanes.

The active hydrogen component and polyisocyanate component are reacted to form a polyurethane polymer which is resistant to hydrocarbons. The resistance is evidenced by swelling very little when soaked in a hydrocarbon. The exemplary hydrocarbon is diesel fuel #2 as defined by SAE AMS 3022 A-87. A rectangular sample measuring $3 \times 3 \times \frac{1}{8}$ inch is placed in a container such that the sample rests on an edge and is supported by a side of the container so that a large proportion of samples surface area is exposed. At least sufficient diesel fuel #2 to completely immerse the sample is added. The fuel is heated to 158° F. for 70 hours. Swelling after soaking is measured by weighing the sample before and after soaking and is expressed as percentage of the original weight gained in the soaking. Practice of the invention preferably produces a polyurethane polymer exhibiting a swell of less than about 15 percent by weight, more preferably less than about 10, and most preferably less than about 5 percent by weight.

The polyurethane polymer produced is advantageously an elastomer, that is the polymer can regain its shape after deformation. That deformation is indicated by elongation measurements greater than about 100% at 75° F., preferably from about 100% to about 400% at 75° F. More preferably the elastomers have elongations of at least about 40% most preferably of from about 40% to about 150% at 250° F. Preferred elastomeric properties include tensile measurements of at least about 1000 psi at 75° F. preferably from about 1000 to about 3000 psi at 75° F., more preferably at least about 300 psi, preferably from about 3000 to about 1000 psi, at 250° F. Both tensile and elongation are measured according to the procedures of ASTM D638-84 or D412-84. ASTM D412-84 is preferably used when a sample of polymer large enough to meet the requirements of the test is available. For smaller samples, ASTM-D638-84 is used. Numerical results of the two tests are considered comparable. A Shore A hardness, as measured according to the procedures of ASTM D-2240-84, of from about 60 to about 90 Shore A is more preferably also achieved.

The polyurethane polymer elastomers produced in the practice of the invention are preferably not open cell foams, more-preferably not foams, most preferably not cellular.

Preferably, the elastomers have densities greater than about 30, more preferably from about 50 to about 90, most preferably from about 60 to about 80 pounds per cubic foot (lb./ft$^3$) (PCF), that is: preferably, densities greater than about 480, more preferably from about 800 to about 1440, most preferably from about 960 to about 1280 kilograms/ cubic meter (kg/m$^3$).

It is also desirable that the polymer have a compression set of less than about 40%, preferably less than about 20%, more preferably less than about 10% when tested by the procedures of ASTM D-395-85, method B, at 250° F.

The polyurethane polymers of the invention are suitable for applications in which the polymer is exposed to hydrocarbons preferably when used in the form of hydrocarbon resistant conduits, containers, seals, mechanical belts, linings, coatings, rollers, machine parts and the like. Conduits include, for instance, pipes, hoses, tubing, gasoline lines, and the like. Containers include, for instance, tanks, bottles, flasks, pans, and the like. Mechanical belts include, for instance, belts which transfer energy from such energy sources as engines, turbines and the like to other moving apparatus such as fans, other parts of engines and the like, such as automotive belts, truck belts, pump belts and the like as well as belts used for transport such as conveyor belts and the like. Seals include, for instance, gaskets; adhesive seals which serve an adhesive function such as hydrocarbon filter seals including fuel filter endcaps; pipe seals; adhesive construction seals and the like; seals which fill gaps such as construction seals, door seals, window seals, shingle seals, and the like; o-rings, and the like; and any polyurethane article which separates other articles and reduces gaps between said articles. Linings include linings of conduits, containers and the like, such as linings for hoses, pipes, tubing, tanks, bottles, boilers, pans and the like. Coatings include surface coverings and other coatings on any object, preferably on an object which may contact or be immersed in hydrocarbons, such a conduit, container, roller, machine part and the like. Machine parts include gears, parts for such equipment as oil field equipment, down-hole equipment, engine parts, pump parts (particularly parts for pumps for petroleum and petroleum products) and the like. Rollers include textile rollers, printing rollers, paper mill rollers, metal processing rollers and the like.

Exemplary of a type of seal of particular utility is a filter endcap for a hydrocarbon filter. A filter endcap is an object which is at one or more ends of a hydrocarbon filter. Advantageously, the filter endcap fits between the filter and a housing for the filter. Preferably, a filter endcap also confines flow of hydrocarbon so that it goes through the filter. Hydrocarbons suitably filtered include petroleum products such as fuels, feedstocks and the like, lubricants, such as oils and the like and other hydrocarbon materials such as solvents, cleaning fluids, and the like. One typical configuration of a filter having two endcaps is shown in FIG. 1. In FIG. 1, there is a cylindrical filter, 12, having a first endcap 11 and a second endcap 13. Filter 12, as illustrated, is a cylindrical pleated paper filter. Other configurations of filters, for instance, generally tubular but having any cross section such as square, rectangular, triangular, or other polygonal cross sections are suitable. Also, the material can be any foraminous material suitable for retaining undesirable materials and allowing the desirable hydrocarbons to pass through. Such materials are known to those skilled in the art. While the filter need not be pleated, an arrangement such as pleating, folding or twisting which allows exposure of the hydrocarbon to a larger surface area than is otherwise available is generally preferable. Each endcap is preferably molded to an end of the filter 12. Those skilled in the art can mold such an endcap onto a filter without undue experimentation. Advantageously, the filter is introduced into a mold for the endcap before the endcap-forming formulation completely hardens, preferably before the formulation is introduced into the mold.

Figure 2:
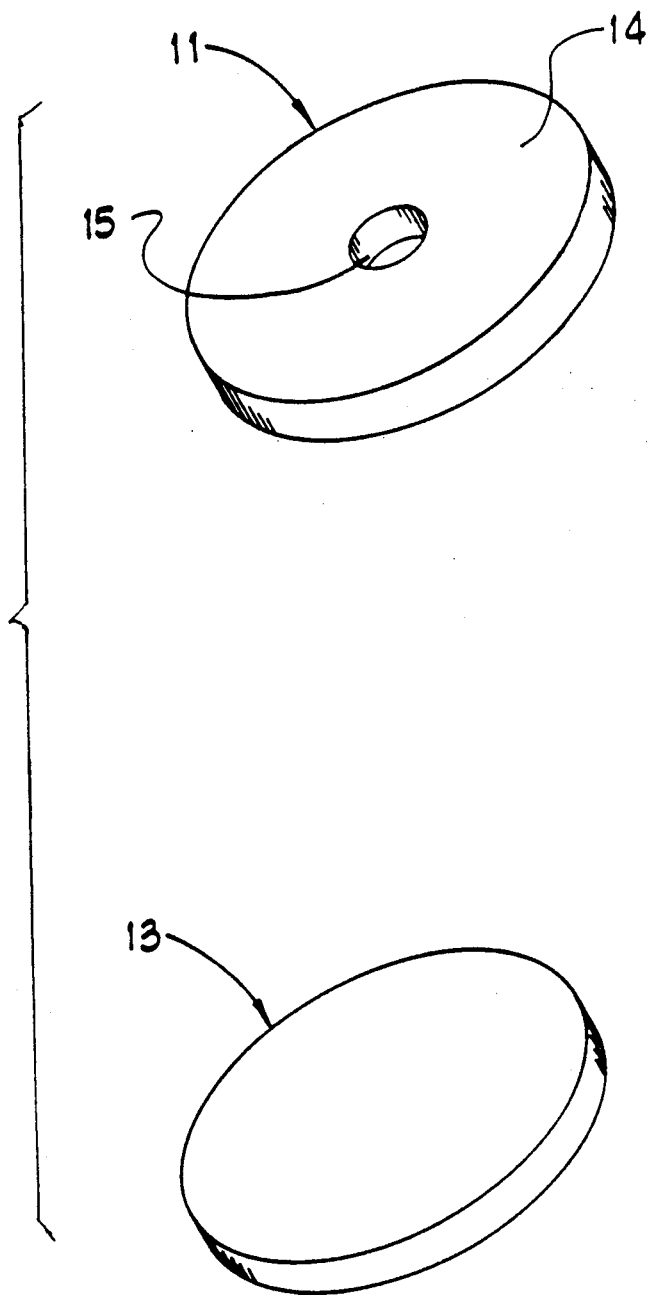
FIG. 2 represents a perspective view of the endcaps of the filter of FIG. 1.

As illustrated in FIG. 2, endcap 11 is of generally a disk shape having a hole 15 generally through the center. The endcap also has an outer surface 14. In the illustrated embodiment, the second endcap 13 has a disk shape without a hole. Endcaps 11 and 13 preferably fit against the filter 12 such that hydrocarbons entering at 15 must flow through the filter 12. There is preferably a housing around the filter. When there is a housing, it would include a means for admitting a hydrocarbon such that an entering hydrocarbon flow would be through hole 15 then through filter 12 to become filtered hydrocarbons. The housing would preferably include a means for confining filtered hydrocarbons such that said hydrocarbons do not mix with incoming hydrocarbons. The housing would also preferably include means for guiding filtered hydrocarbons from the filter.

Figure 3:
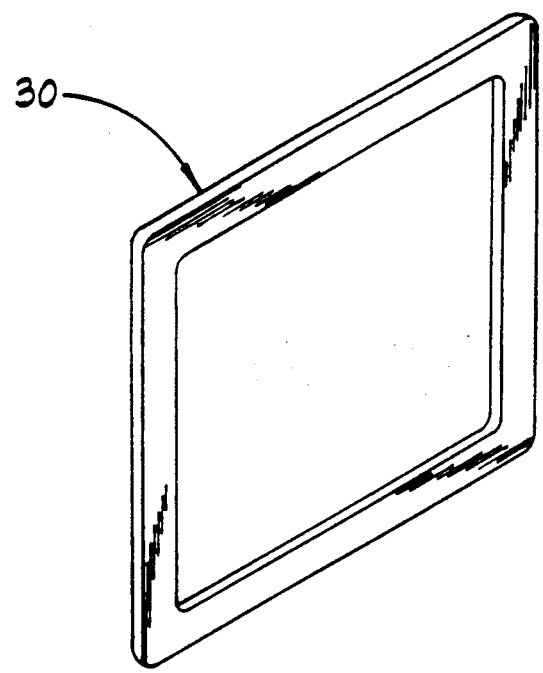
FIG. 3 represents a perspective view of a gasket.

FIG. 3 represents a perspective view of a gasket 30 which is suitably formed of the polyurethane polymer of the invention. Gasket 30 has a generally rectangular shape and is exemplary of the seals of the invention. Those skilled in the art are able to form seals of the invention without undue experimentation. Preferably the seals ar cast or molded.

Figure 4:
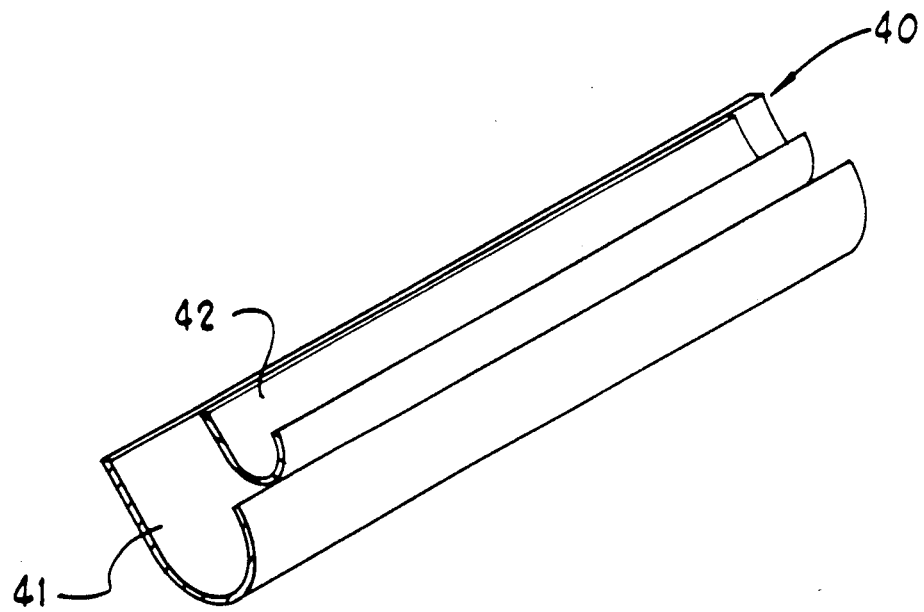
FIG. 4 represents a cutaway perspective view of a lined chute.

FIG. 4 represents a cut away perspective view of a lined chute 40. Chute 40 has a structural member 41 in a curved shape suitable for guiding materials. Structural member 41 is suitably made of any material, preferably one strong enough to retain structural shape and integrity and support the weight of the chute and the materials guided, such as metal or plastic. Chute 40 additionally has a lining 42 suitably formed of the polyurethane polymer of the invention. Lining 42 is preferably adhered to structural member 41. Lining 42 is exemplary of linings of the invention. Those skilled in the art are able to form linings for conduits, containers and similar articles without undue experimentation.

Figure 5:
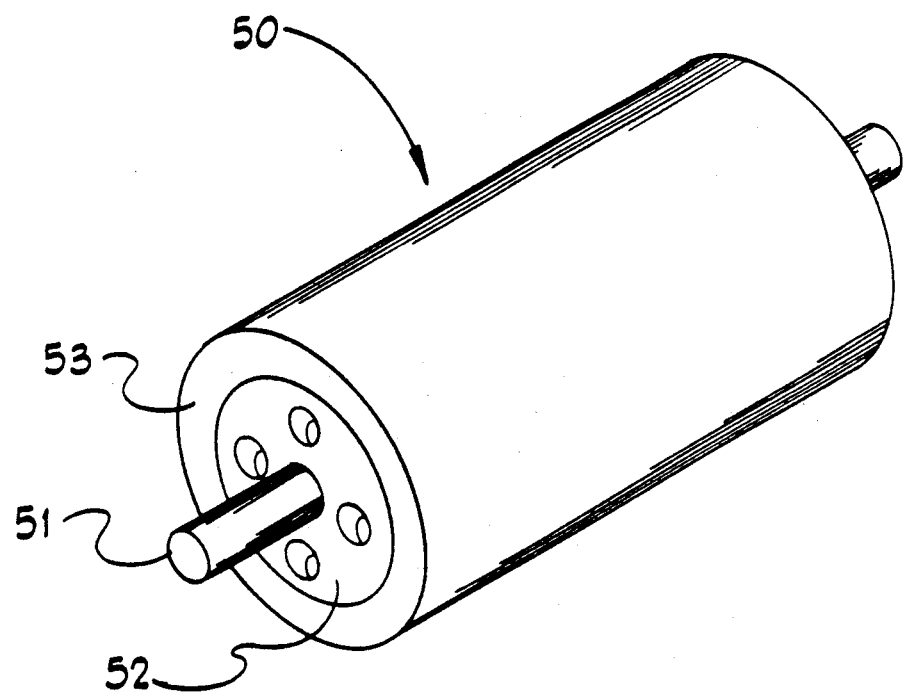
FIG. 5 represents a perspective view of a roller.

FIG. 5 represents a perspective view of a roller 50 having a shaft 51, an inner cylinder 52 and an outer portion 53. Shaft 51 and inner cylinder 52 are suitably formed from any material suitable for maintaining structural integrity and function. Such materials include metals, plastics and the like. Outer portion 53, and optionally shaft 51 and/or inner cylinder 52 are suitably formed of the polyurethane polymer of the invention. Roller 50 is exemplary of rollers of the invention. Advantageously, a roller has one member serving the combined functions of inner cylinder 52 and outer portion 53, said member being formed of the polyurethane polymer of the invention. Those skilled in the art are able to form rollers of the invention without undue experimentation. Preferably the rollers are cast or molded. Suitably, an outer portion as illustrated by 53 in FIG. 5 may be coated onto an inner cylinder as represented by 52 in FIG. 5.

Figure 6:
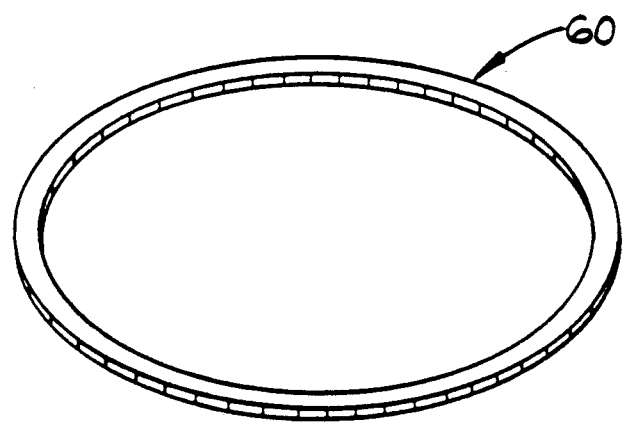
FIG. 6 represents a perspective view of mechanical belt.

FIG. 6 represents a perspective view of a mechanical belt 60. Mechanical belt 60 is suitably ring-shaped as illustrated or may have another configuration suitable for use as a belt such as a more oval shape than illustrated. The belt is suitably formed of the polyurethane polymer of the invention. Those skilled in the art are able to form belts of the invention without undue experimentation. Preferably the belts are cast or molded.

Figure 7:
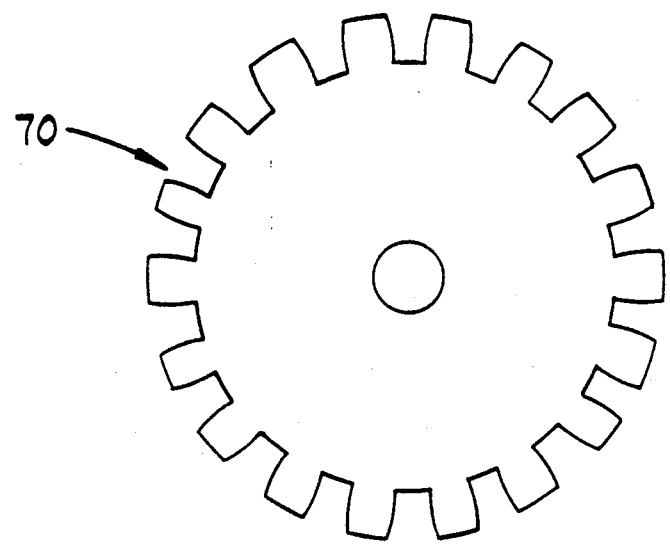
FIG. 7 represents a perspective view of a gear.

FIG. 7 represents a perspective view of a gear 70 suitably formed of the polyurethane polymer of the invention. Preferably the gears are cast or molded.

Figure 8:
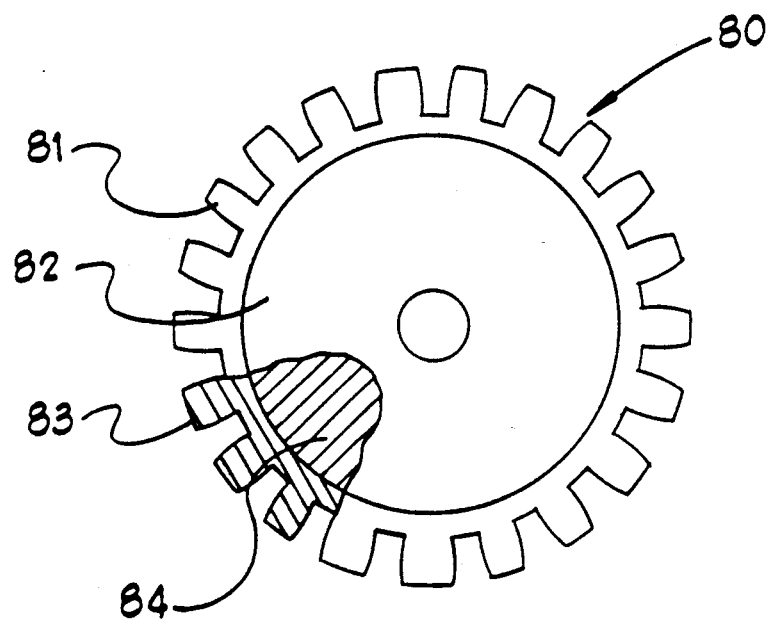
FIG. 8 represents a perspective view of a gear having an outer layer, partially in section.

FIG. 8 represents a perspective view of a gear 80, having an inner layer 81 and an outer layer 82. Gear 80 is partially cut away illustrating the composition of layer 82 in cut away 84 as metal and illustrating the composition of outer layer 83 as plastic. Outer layer 82 is suitably formed of the polyurethane polymer of the invention. In other embodiments of the invention the inner layer is suitably formed of any material such as a metal or plastic having sufficient strength, hardness and wearing qualities suitable for the function of the gear. Those skilled in the art are able to form gears of the invention without undue experimentation. When there are inner and outer layers of the gear, the gear is preferably formed by compression molding or extrusion.

Figure 9:
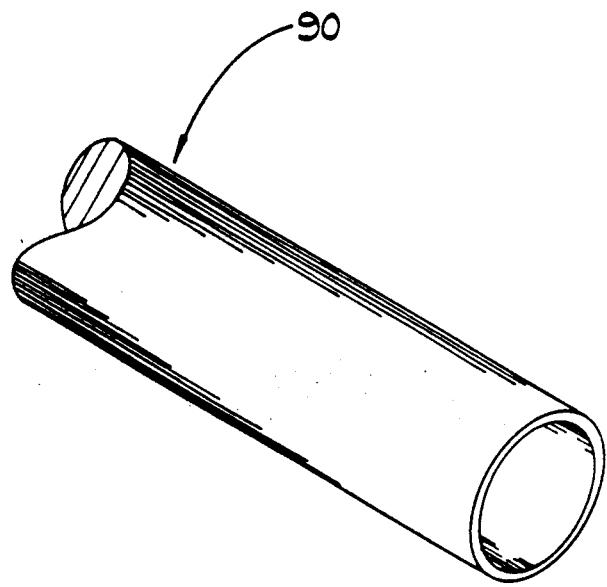
FIG. 9 represents a perspective view of a conduit.
Figure 10:
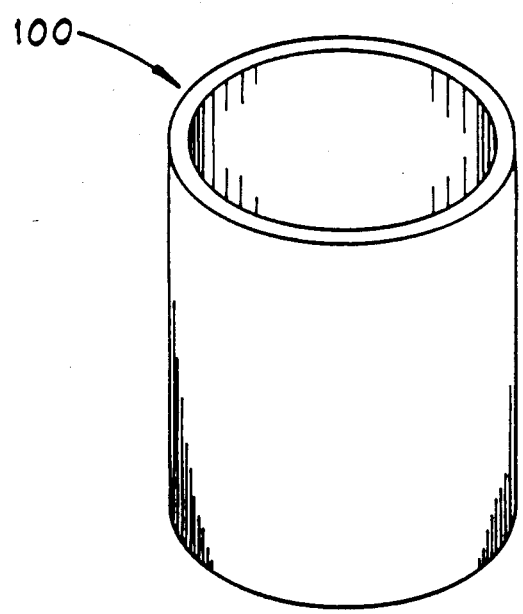
FIG. 10 represents a perspective view of a container.

FIG. 9 represents a perspective view of a conduit 90 suitably formed of the polyurethane polymer of the invention. FIG. 10 represents a perspective view of a container 100 suitably formed of the polyurethane polymer of the invention. Those skilled in the art are able to form conduits and containers of the invention without undue experimentation. Preferably the conduits and containers are cast or molded.

Those skilled in the art will recognize that the polyurethane polymers of the invention are particularly suitable for other applications in which the polymer is exposed to hydrocarbons or other materials which similarly swell commonly-encountered polyurethanes. The polyurethane polymers of the invention are, however, generally preferably used in environments wherein there is little exposure to water, unless swelling from exposure to water is desirable, for instance to block leakage or flow of water. When exposure to water is necessary, it is generally preferable to balance water and hydrocarbon swelling tendencies of the polymer by reducing the oxyethylene content of the polyether polyol to minimum levels needed to attain hydrocarbon resistance.

The following examples are offered to illustrate the invention, but are not intended to limit the scope thereof. All parts and percentages are by weight unless otherwise indicated.

EXAMPLE 1

Preparation of a Hydrocarbon Resistant Polyurethane

A stoichiometric amount of Polyol A, Voranol™ CP-1421, a 5000 molecular weight triol containing about 75% oxyethylene groups and 25 weight percent oxypropylene groups, commercially available from The Dow Chemical Company is reacted with Isocyanate A, a polymeric diisocyanate having a molecular weight of about 300, commercially available from The Dow Chemical Company under the trade designation PAPI-94, for 2 hours at 80° C. to form a prepolymer having an unreacted, free isocyanate content of about 11.5% as determined by the dibutylamine back titration method of ASTM 1638-74.

Four hundred parts by weight of prepolymer and 47 parts of 1,4 butane diol along with 0.1 part by weight a bismuth neodecanoate catalyst commercially available from Cosan Chemical Corp. under the trade designation COSCAT-83 (hereinafter Catalyst A) is then added to the prepolymer to form an admixture. The admixture is vigorously mixed for 1 minute. The admixture is then poured into preheated (105° C.) aluminum molds measuring 10.5×7.5×0.1 inch and cured with a compression of 10,000 lbs. (127 psi) in a 105° C. hydraulic press for 1 hour to form molded parts. The molded parts are then removed from the press and cured for sixteen hours in a 100° C. oven. The cured parts are then fully immersed in a hydrocarbon solvent (Diesel Fuel #2) which is heated under reflux to 158° F. Preimmersion part weight is 5.08 grams. After 70 hours of immersion, the part weight is 5.43 grams, resulting in a 6.990 weight percent solvent absorption.

EXAMPLES 2-4

Comparison of Properties of Different Formulations

The polyurethane polymer of Example 2 is prepared from a mixture of the ingredients in the amounts listed in Table 1, wherein Polyol A, Isocyanate A, and Catalyst A are as identified in Example 1. Surfactant A is an organosilane surfactant degassing agent commercially available form Union Carbide Corp. under the trade designation L-5304. Isocyanate B is a mixture of methylene diphenyldiisocyanate with tripropylene glycol and dipropylene glycol, having an average molecular weight of 364, commercially available from The Dow Chemical Company under the trade designation Isonate 181. Polyol B is a polyether triol of 2600 molecular weight formed from a heterofeed mixture of 50 weight percent ethylene oxide and 50 weight percent propylene oxide commercially available from The Dow Chemical Company under the trade designation Polyglycol 15-200. Polyol C is a 400 molecular weight polyether having about 100 weight percent oxyethylene groups and a nominal functionality of 2. The mixture is vacuum degassed for 2 minutes. Then, Isocyanate A is mixed into the mixture to form an admixture which is degassed for and additional 2 minutes. The admixture is poured into a open steel mold which is maintained at a temperature of 50° C. for a period of 8 hours, after which it is placed in an oven at 180° F. for a period of 24 hours.

Shore A hardness is measured according to the procedure of ASTM 2240-84. Elongation and tensile are measured according to the procedures of ASTM 638-84. Fuel Swell is determined as described in Example 1.

TABLE 1

| Example: | 2 | 3 | 4 |
|---|---|---|---|
| Isocyanate A | 113.3 | | |
| Isocyanate B | | 140.6 | 153 |
| Polyol C | | | 15 |
| Polyol B | 150 | | |
| Polyol A | | 150 | 135 |
| 1,4 Butane diol | 29.4 | 29.4 | 29.4 |
| Surfactant A | 0.4 | 0.4 | 0.4 |
| Catalyst A | 0.2 | 0.2 | 0.2 |
| Index | 104 | 104 | 104 |
| Hardness, Shore A | 89 | 83 | 89 |
| Tensile (psi) @ 250° F. | * | 409 | 438 |
| Elongation (%) @ 250° F. | * | 127 | 132 |
| Fuel Swell (wt %) | 3.59 | 4.64 | 3.75 |
| Molecular weight/crosslink | 1478 | 4850 | 5644 |
| Hard segment wt % | 46.0 | 62.0 | 60.2 |

*sample crumbles

The data in Table 1 shows hydrocarbon fuel swells were maintained below 10% for each example. A range of molecular weights/crosslink and weight percent hard segment produce polyurethanes having low fuel swell. Examples 3 and 4 which have molecular weights per crosslink greater than 2700 have tensile measurements greater than 300 psi and elongation greater than 100 250° F.

EXAMPLES 5-8

Use of Various Formulations

The procedure of Example 2 is repeated using the materials in the amounts indicated in Table 2. Isocyanate C is a polymethylene polyphenylisocyante having an average molecular weight of 400 commercially available from The Dow Chemical Company under the trade designation PAPI 901. Chain Extender A is a 270 molecular weight poly(ethylene oxide) triol commercially available from The Dow Chemical Company under the trade designation Isonol 93.

For the high temperature flex test an 8×8×1/8 inch plaque of cured polymer is heated in an oven to 250° F. and allowed to equilibrate at that temperature for one hour. Then the plaque is removed from the oven and a corner is bent back. Cracking or absence of cracking is noted.

TABLE 2

| Example: | 5 | 6 | 7 | 8 |
|---|---|---|---|---|
| Isocyanate A | 64.2 | 0 | 0 | 0 |
| Isocyanate B | 0 | 0 | 68 | 105 |
| Isocyanate C | 0 | 147.4 | 51 | 25 |
| Polyol A | 75 | 150 | 150 | 150 |
| Polyol B | 81 | 0 | 0 | 0 |
| Polyol C | 0 | 0 | 0 | 0 |
| Chain Extender A | 29 | 0 | 0 | 0 |
| 1,4-butane diol | — | 29.4 | 29.4 | 29.4 |
| Index | 1.07 | 1.09 | 1.04 | 1.04 |
| Hardness, Shore A | — | — | 75A | 80A |
| Molecular weight/crosslink | 992 | 3072 | 2750 | 3746 |
| High temp. tensile @ 250° F. (psi) | — | — | 530 | 620 |
| High temp. elongation @ 250° F. (%) | — | — | 48 | 64 |
| Fuel swell | — | — | 5 | 3.8 |
| High temperature Flex Test @ 250° F. | Cracks | No crack | No cracks | No cracks |

The data in Table 2 show that polyurethanes formed using molecular weights per crosslink of 2750-3746 do not crack in the high temperature flex test, while Example 5 has a molecular weight per crosslink of 992 and cracks in the test. Further, Examples 7 and 8 exhibit desirable elastomeric tensile and elongation properties.

EXAMPLES 9–13

Use of Varying Formulations

The procedure of Example 2 is repeated using the materials indicated in Table 3 in the amounts indicated therein. Isocyanate D is methylene diisocyanate which is commercially available from The Dow Chemical Company under the trade designation Isonate ® 125 M. Properties are measured as in previous examples and the results are recorded in Table 3. Additionally, the samples are soaked in water for 7 days at a temperature of 70° C. Weight percent gain is measured.

The hard segment content and molecular weight per crosslink are calculated as indicated in the specification. For example, the calculations of molecular weight per cross link for Example 10 follows the table.

TABLE 3

| Example: | 9 | 10 | 11 | 12 | 13 |
|---|---|---|---|---|---|
| Isocyanate A | 102 | 51 | 25 | — | — |
| Isocyanate B | — | 68 | 106 | 141 | — |
| Isocyanate D | | | | | 66 |
| Polyol A | 150 | 150 | 150 | 150 | 150 |
| 1,4 Butane diol | 29.4 | 29.4 | 29.4 | 29.4 | 18.3 |
| Total parts by weight | 281.4 | 298.4 | 310.4 | 320.4 | 234.3 |
| Fuel Swell (wt %) | 5 | 4 | 5 | 4 | 15 |
| Tensile St. (psi) (@ 250° F.) | 175 | 504 | 707 | 450 | — |
| Elongation (%) (@ 250° F.) | 33 | 51 | 73 | 127 | — |
| Molecular Weight/Crosslink | 1800 | 2750 | 3740 | 4850 | 3930 |
| Hard Segment (wt %) | 42.1 | 54.0 | 57.2 | 62.0 | 31.1 |
| Water Absorption (% gain after 7 days) | 6.8 | 6.9 | 7.8 | 7.1 | — |

Total parts refers to total parts by weight of all components in each Example.

The data in Table 3 shows that each Example has a low fuel swell. Increasing molecular weights/crosslink improve elastomeric properties indicated by tensile and elongation. Maintaining very low fuel swell values is favored by increasing hard segment content when molecular weight per crosslink is increased (Compare Examples 11 and 13). Further, the polyurethane absorb little water.

The calculations of molecular weight per crosslink for Example 10 is as follows:

| | Functionality* | Equivalent Weight | Parts by weight | Equivalents @ 100 index | Equivalent for crosslink | Excess Equivalents | Total excess equivalents |
|---|---|---|---|---|---|---|---|
| Isocyanate A | 2.3 | 131 | 51 | 0.374 | 0.049 | 0.015 | 0.064 |
| Isocyanate B | 2.0 | 182 | 68 | 0.359 | — | 0.014 | 0.014 |
| Polyol A | 3.0 | 1670 | 150 | 0.09 | 0.03 | — | 0.03 |
| 1,4 butane diol | 2.0 | 45 | 29.4 | 0.653 | — | — | — |

*Theoretical or nominal functionality is used.

The molecular weight per crosslink then is: 298.4/0.108=2750.

What is claimed is:

1. A thermoset polyurethane polymer prepared from a reaction mixture comprising
   (a) a polyvisocyanate component; and
   (b) an active hydrogen component containing at least about 50 weight percent based on total active hydrogen component of at least one polyether polyol having an average nominal functionality of at least about 3 and containing at least about 50 weight percent oxyethylene units, said polyether polyol not being ethylene oxide capped and containing secondary hydroxy groups;

said thermoset polyurethane polymer being a hydrocarbon resistant elastomer.

2. The polyurethane polymer of claim 1 wherein the hydrocarbon resistant elastomer gains less than about 15 weight percent of its original weight when soaked in diesel fuel #2 for 70 hours at 158° F.

3. The polyurethane polymer of claim 2 wherein the isocyanate component is an aromatic isocyanate or mixture thereof.

4. The polyurethane polymer of claim 3 wherein the aromatic isocyanate is diphenylmethane-2,4'-diisocyanate, diphenylmethane-4,4'-diisocyanate, polymethylene polyphenylisocyanate or a mixture thereof.

5. The polyurethane polymer of claim 4 wherein the aromatic isocyanate is a mixture of at least one diphenylmethane-diisocyanate and polymethylene polyphenylisocyanate.

6. The polyurethane polymer of claim 5 wherein the aromatic isocyanate mixture contains at least about 25 weight percent of polymethylene polyphenylisocyanate.

7. The polyurethane polymer of claim 6 wherein the active hydrogen component contains insufficient polymer polyol to raise the Shore A hardness as measured by the procedures of ASTM 2240-84 more than about 5 Shore A units above the hardness of a similar polyurethane prepared from the same components in the absence of polymer polyol.

8. The polyurethane polymer of claim 7 wherein the polyurethane polymer is an elastomer having an elongation of at least about 100% at 75° F. as measured by the procedures of ASTM D412-84.

9. The polyurethane polymer of claim 3 wherein the active hydrogen component contains insufficient polymer polyol to raise the Shore A hardness as measured by the procedures of ASTM 2240-84 more than about 5 Shore A units above the hardness of a similar polyurethane prepared from the same components in the absence of polymer polyol.

10. The polyurethane polymer of claim 9 wherein the polyurethane polymer is an elastomer having an elongation of at least about 100% at 75° F. and a tensile strength of at least about 1000 psig at 75° F. as measured by the procedures of or ASTM D412-84.

11. The polyurethane polymer of claim 3 wherein the polyether polyol (b)(i) contains from about 50 to about 90 weight percent oxyethylene units.

12. The polyurethane polymer of claim 11 wherein the polyether polyol (b)(i) contains from about 60 to about 85 weight percent oxyethylene units.

13. The polyurethane polymer of claim 12 wherein the polyether polyol (b)(i) has a molecular weight of from about 3000 to about 6500.

14. The polyurethane polymer of claim 13 wherein the polyether polyol (b)(i) has a molecular weight of from about 4000 to about 6000 and a functionality of from about 3 to about 4.

15. The polyurethane polymer of claim 14 wherein the active hydrogen component additionally contains (b) (ii) at least one chain extender.

16. The polyurethane polymer of claim 15 wherein the chain extender (b) (ii) is a diol having a molecular weight of less than about 400.

17. The polyurethane polymer of claim 16 wherein the aromatic isocyanate is diphenylmethane2,4'-diisocyanate, diphenylmethane-4,4'-diisocyanate, polymethylene polyphenylisocyanate or a mixture thereof.

18. The polyurethane polymer of claim 17 wherein the aromatic isocyanate is a mixture of at least one diphenylmethane-diisocyanate and at least about 25 weight percent polymethylene polyphenylisocyanate.

19. The polyurethane polymer of claim 18 having a density greater than about 480 kg/m3.

20. The polyurethane polymer of claim 19 having a density from about 800 kg/m3 to about 1440 kg/m3.

21. The polyurethane polymer of claim 20 wherein the polyurethane polymer is an elastomer having an elongation of at least about 100% at 75° F. as measured by the procedures of ASTM D412-84.

22. The polyurethane polymer of claim 21 wherein the polyurethane polymer gains less than about 10 weight percent of its original weight when soaked in diesel fuel #2 for 70 hours at 158° F.

23. The polyurethane polymer of claim 20 wherein the polyurethane polymer gains less than about 10 weight percent of its original weight when soaked in diesel fuel #2 for 70 hours at 158° F.

24. The polyurethane polymer of claim 19 wherein the polyurethane polymer gains less than about 5 weight percent of its original weight when soaked in diesel fuel #2 for 70 hours at 158° F.

25. The polyurethane polymer of claim 19 having a molecular weight per crosslink of at least about 2700.

26. The polyurethane polymer of claim 12 having a density from about 960 kg/m3 to about 1280 kg/m3 and wherein the hydrocarbon resistant elastomer gains less than about 10 weight percent of its original weight when soaked in diesel fuel #2 for 70 hours at 158° F.

27. The polyurethane polymer of claim 12 having a molecular weight per crosslink of at least about 2700.

* * * * *